US012749855B2

(12) United States Patent
Huang et al.

(10) Patent No.: US 12,749,855 B2
(45) Date of Patent: Sep. 29, 2026

(54) ELECTRICAL CONNECTOR WITH IMPROVED GROUNDING EFFECT

(71) Applicant: DONGGUAN LUXSHARE TECHNOLOGIES CO., LTD, Dongguan City (CN)

(72) Inventors: Bin Huang, Dongguan City (CN); Hongji Chen, Dongguan City (CN); Kunlin Yao, Dongguan City (CN); Chuanqi Gong, Dongguan City (CN)

(73) Assignee: DONGGUAN LUXSHARE TECHNOLOGIES CO., LTD, Dongguan City (CN)

( * ) Notice: Subject to any disclaimer, the term of this patent is extended or adjusted under 35 U.S.C. 154(b) by 358 days.

(21) Appl. No.: 18/511,537

(22) Filed: Nov. 16, 2023

(65) Prior Publication Data

US 2024/0347978 A1 Oct. 17, 2024

(30) Foreign Application Priority Data

Apr. 11, 2023 (CN) ........................ 202310384019.X

(51) Int. Cl.
*H01R 13/64* (2006.01)
*H01R 13/24* (2006.01)
(Continued)

(52) U.S. Cl.
CPC ..... *H01R 13/6471* (2013.01); *H01R 13/2442* (2013.01); *H01R 13/424* (2013.01)

(58) Field of Classification Search
CPC ........................ H01R 13/6471; H01R 13/2442
(Continued)

(56) References Cited

U.S. PATENT DOCUMENTS

| | | | | |
|---|---|---|---|---|
| 9,692,183 B2 * | 6/2017 | Phillips | .............. | H01R 13/6471 |
| 10,283,910 B1 * | 5/2019 | Chen | ........................ | H01R 4/04 |

(Continued)

FOREIGN PATENT DOCUMENTS

| | | |
|---|---|---|
| CN | 104701677 A | 6/2015 |
| CN | 215221060 U | 12/2021 |

(Continued)

OTHER PUBLICATIONS

U.S. Office Action for U.S. Appl. No. 18/511,537, dated Mar. 25, 2026.

*Primary Examiner* — Phuong K Dinh
(74) *Attorney, Agent, or Firm* — Birch, Stewart, Kolasch & Birch, LLP

(57) ABSTRACT

An electrical connector includes an insulating body, a grounding piece and a terminal module. The insulating body includes a mating slot for receiving a mating element. The mating element includes a first ground conductive pad. The grounding piece includes a first grounding elastic arm and a second grounding elastic arm. The terminal module includes a signal terminal and a ground terminal. The ground terminal includes a first elastic contact arm. The signal terminal includes a second elastic contact arm. When the mating element is inserted into the mating slot and inserted in place, the first grounding elastic arm and the first elastic contact arm are configured to abut against the first ground conductive pad, and the first elastic contact arm is configured to abut against the second grounding elastic arm.

20 Claims, 18 Drawing Sheets

(51) Int. Cl.
*H01R 13/424* (2006.01)
*H01R 13/6471* (2011.01)

(58) Field of Classification Search
USPC .......................................... 439/60, 108, 100
See application file for complete search history.

(56) References Cited

U.S. PATENT DOCUMENTS

| | | | |
|---|---|---|---|
| 2015/0229082 | A1 | 8/2015 | Yu et al. |
| 2023/0075216 | A1 | 3/2023 | Jin et al. |

FOREIGN PATENT DOCUMENTS

| | | | |
|---|---|---|---|
| CN | 114927894 | A | 8/2022 |
| TW | M385131 | U1 | 7/2010 |
| TW | M553887 | U | 1/2018 |
| TW | M638656 | U | 3/2023 |

* cited by examiner

ELECTRICAL CONNECTOR WITH IMPROVED GROUNDING EFFECT

CROSS-REFERENCE TO RELATED APPLICATION

This patent application claims priority of a Chinese Patent Application No. 202310384019.X, filed on Apr. 11, 2023 and titled "ELECTRICAL CONNECTOR", the entire content of which is incorporated herein by reference.

TECHNICAL FIELD

The present disclosure relates to an electrical connector, which belongs to a technical field of connectors.

BACKGROUND

An electrical connector in the related art generally includes an insulating body and a plurality of conductive terminals. The insulating body defines a slot for receiving a mating element (for example, a mating connector). The plurality of conductive terminals include a plurality of signal terminals and a plurality of ground terminals. The signal terminals and the ground terminals are typically provided with resilient arms extending into the slot.

With the continuous improvement of transmission rate requirements of the electrical connectors, how to improve the grounding design to improve the quality of data transmission of the signal terminals is a technical problem to be solved by those skilled in the art.

SUMMARY

An object of the present disclosure is to provide an electrical connector with improved grounding effect.

In order to achieve the above object, the present disclosure adopts the following technical solution: an electrical connector, including: an insulating body defining a mating slot configured to receive a mating element along a mating direction, the mating element having at least one first signal conductive pad and at least one first ground conductive pad; a grounding piece including a base portion, at least one first grounding elastic arm connected to the base portion and at least one second grounding elastic arm connected to the base portion, the at least one first grounding elastic arm extending into the mating slot; and a terminal module including at least one signal terminal and at least one ground terminal, the at least one ground terminal including a first elastic contact arm, the at least one the signal terminal including a second elastic contact arm configured to abut against the at least one first signal conductive pad; wherein the first grounding elastic arm and the first elastic contact arm are arranged at intervals along the mating direction; when the mating element is inserted into the mating slot and inserted in place, the first grounding elastic arm and the first elastic contact arm are configured to abut against the at least one first ground conductive pad, and the first elastic contact arm is configured to abut against the second grounding elastic arm.

In order to achieve the above object, the present disclosure adopts the following technical solution: an electrical connector, including: an insulating body defining a mating slot configured to at least partially receive a mating element along a mating direction, the mating element being configured to at least one first signal conductive pad and at least one first ground conductive pad; a metallic grounding piece including at least one first grounding elastic arm and at least one second grounding elastic arm, the at least one first grounding elastic arm extending into the mating slot; and a terminal module including at least one signal terminal and at least one ground terminal, the at least one ground terminal including a first elastic contact arm, the at least one the signal terminal including a second elastic contact arm configured to abut against the at least one first signal conductive pad; wherein the first grounding elastic arm and the first elastic contact arm are arranged at intervals along the mating direction; when the mating element is inserted into the mating slot and inserted in place, the first grounding elastic arm and the first elastic contact arm abut against the at least one first ground conductive pad, and the first elastic contact arm abut against the second grounding elastic arm.

Compared with the prior art, the present disclosure has no ground plate. The grounding piece includes a base portion, at least one first grounding elastic arm connected to the base portion, and at least one second grounding elastic arm connected to the base portion. The first grounding elastic arm extends into the mating slot. When the mating element is inserted into the mating slot and inserted in place, the first grounding elastic arm and the first elastic contact arm are configured to abut against the first ground conductive pad, and the first elastic contact arm is configured to abut against the second grounding elastic arm. In such a configuration, the first grounding elastic arm of the present disclosure abuts against the first ground conductive pad to form a first ground contact; the first elastic contact arm of the present disclosure abuts against the first ground conductive pad to form a second ground contact; and the first elastic contact arm of the present disclosure abuts against the second grounding elastic arm to form a third ground contact. By forming three ground contacts, the grounding return path is reduced and the grounding and shielding effects is improved.

DETAILED DESCRIPTION

Figure 1:
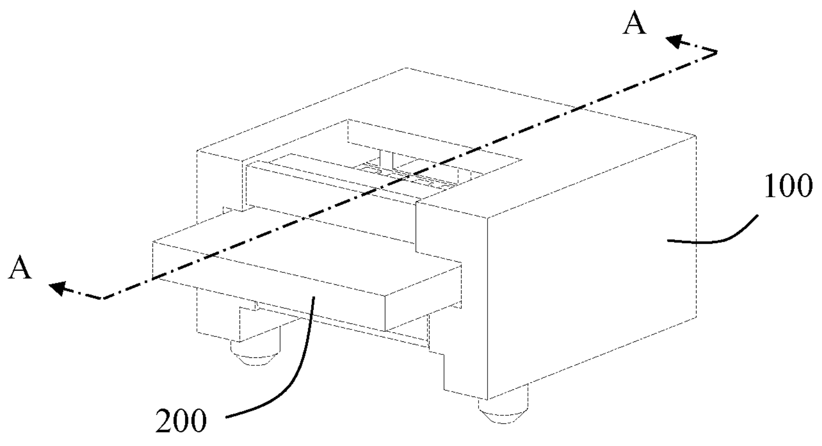
FIG. 1 is a schematic perspective view of an electrical connector assembly in accordance with an illustrated embodiment of the present disclosure.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms "a", "said", and "the" used in this application and the appended claims are also intended to include plural forms unless the context clearly indicates other meanings.

It should be understood that the terms "first", "second" and similar words used in the specification and claims of this application do not represent any order, quantity or importance, but are only used to distinguish different components. Similarly, "an" or "a" and other similar words do not mean a quantity limit, but mean that there is at least one; "multiple" or "a plurality of" means two or more than two. Unless otherwise noted, "front", "rear", "lower" and/or "upper" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects. The term "a plurality of" mentioned in the present disclosure includes two or more.

Hereinafter, some embodiments of the present disclosure will be described in detail with reference to the accompanying drawings. In the case of no conflict, the following embodiments and features in the embodiments can be combined with each other.

Referring to FIG. 1 to FIG. 4, the present disclosure discloses an electrical connector assembly, which includes an electrical connector 100 and a mating element 200 mated with the electrical connector 100. The mating element 200 is at least partially inserted into the electrical connector 100 along a mating direction M. In one embodiment of the present disclosure, the electrical connector 100 is a receptacle connector for being mounted to a circuit board (not shown). The electrical connector 100 and the circuit board may be mounted by through-hole mounting, surface mounting, press-fit mounting, or mixed mounting of the above two or more mounting methods. The various mounting methods above are well known to those skilled in the art, which will not be repeated in the present disclosure. In the illustrated embodiment of the present disclosure, the electrical connector 100 and the circuit board are mounted by surface mounting. Of course, in other embodiments, the electrical connector 100 may also be a cable connector.

The mating element 200 may be a mating connector, a mating circuit board, and the like. In some embodiments, the mating connector 200 includes a tongue plate, and the tongue plate is provided with a plurality of conductive pads. In some other embodiments, the tongue plate of the mating connector 200 is formed by a built-in circuit board. The built-in circuit board is provided with the plurality of conductive pads.

Figure 3:
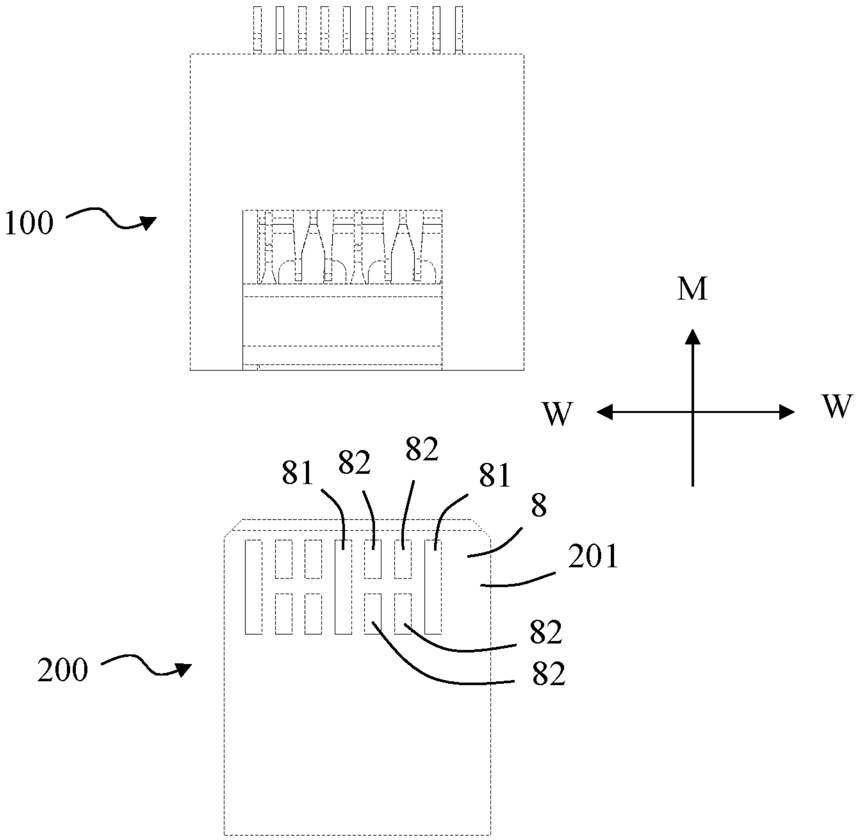
FIG. 3 is a top view of FIG. 2.
Figure 4:
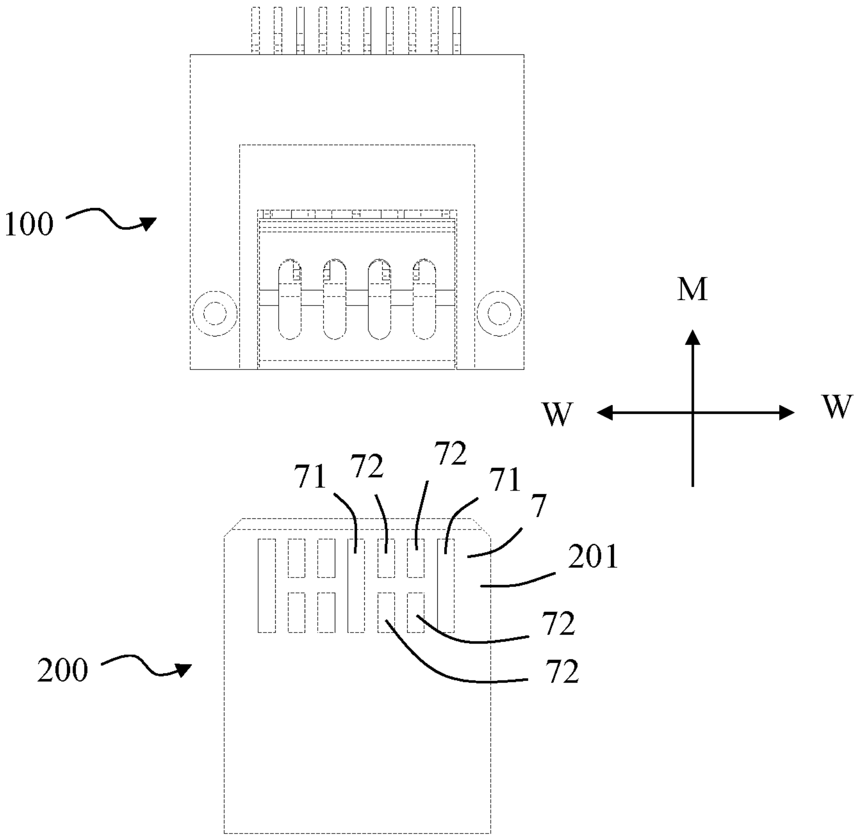
FIG. 4 is a bottom view of FIG. 2.

As shown in FIG. 3 and FIG. 4, in one embodiment of the present disclosure, the mating component 200 is the mating circuit board, which includes an insertion portion 201 for being inserted into the electrical connector 100. The insertion portion 201 includes a lower surface 7 and an upper surface 8. A plurality of first ground conductive pads 71 and a plurality of first signal conductive pads 72 are arranged on the lower surface 7 at intervals along a width direction W-W. Two first signal conductive pads 72 adjacent to each other along the width direction W-W form a first differential pair, so as to increase the speed of signal transmission. Along the width direction W-W, two sides of each first differential pair are respectively provided with one first ground conductive pad 71 so as to improve the quality of signal transmission. In one embodiment of the present disclosure, each first signal conductive pad 72 is of two-section configuration along the mating direction M. Along the mating direction M, a length of each first ground conductive pad 71 is greater than a length of each first signal conductive pad 72 of the two-section configuration. Setting the first ground conductive pad 71 with a relatively long length is beneficial to provide better shielding for the first differential pair, thereby improving signal transmission quality at high transmission speeds.

Similarly, the upper surface 8 is provided with a plurality of second ground conductive pads 81 and a plurality of second signal conductive pads 82 arranged at intervals along the width direction W-W. Two second signal conductive plates 82 adjacent along the width direction W-W form a second differential pair, so as to increase the speed of signal transmission. Along the width direction W-W, two sides of each second differential pair are respectively provided with one second ground conductive pad 81 to improve the quality of signal transmission. In one embodiment of the present disclosure, each second signal conductive pad 82 is of two-section configuration along the mating direction M. Along the mating direction M, a length of each second ground conductive pad 81 is greater than a length of each second signal conductive pad 82 of the two-section configuration. Setting the second ground conductive pad 81 with a relatively long length is beneficial to provide better shielding for the second differential pair, thereby improving signal transmission quality at high transmission speeds.

Referring to FIG. 2, FIG. 5, FIG. 6, and FIG. 8 to FIG. 10, the electrical connector 100 includes an insulating body 1, a metallic grounding piece 2 installed on the insulating body 1, a terminal module 3 installed in the insulating body 1, and an installation block 4 installed in the insulating body 1 and mated with the terminal module 3.

Figure 9:
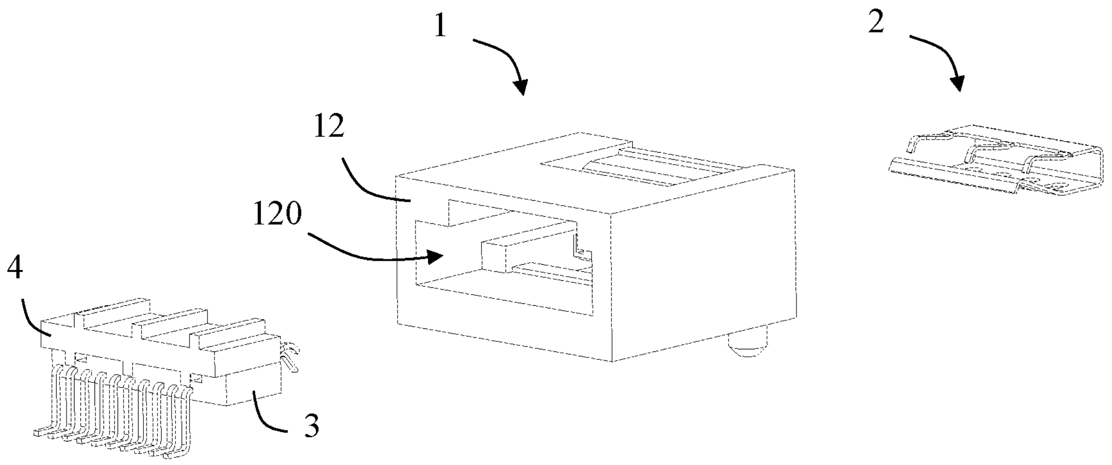
FIG. 9 is a perspective exploded view of FIG. 8 from another angle.
Figure 10:
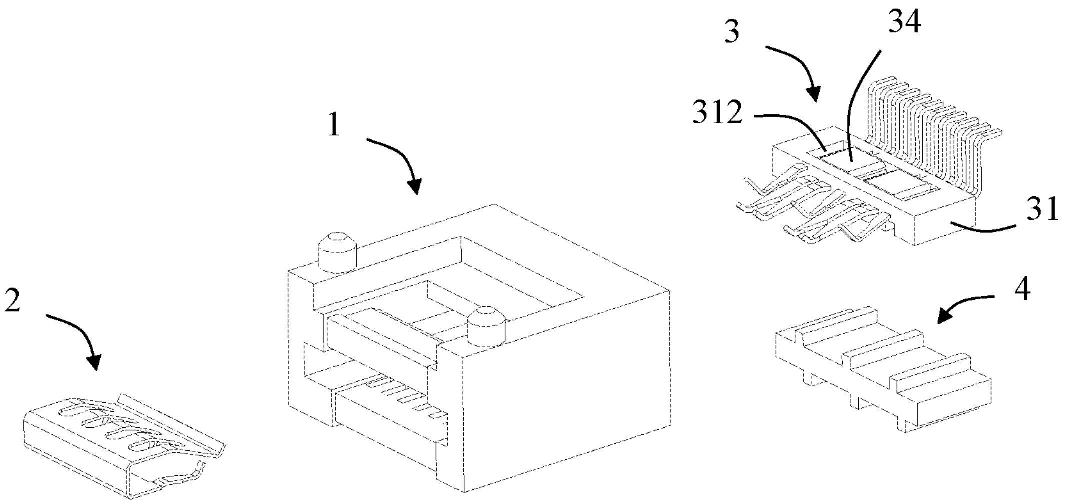
FIG. 10 is a perspective exploded view of the electrical connector.
Figure 11:
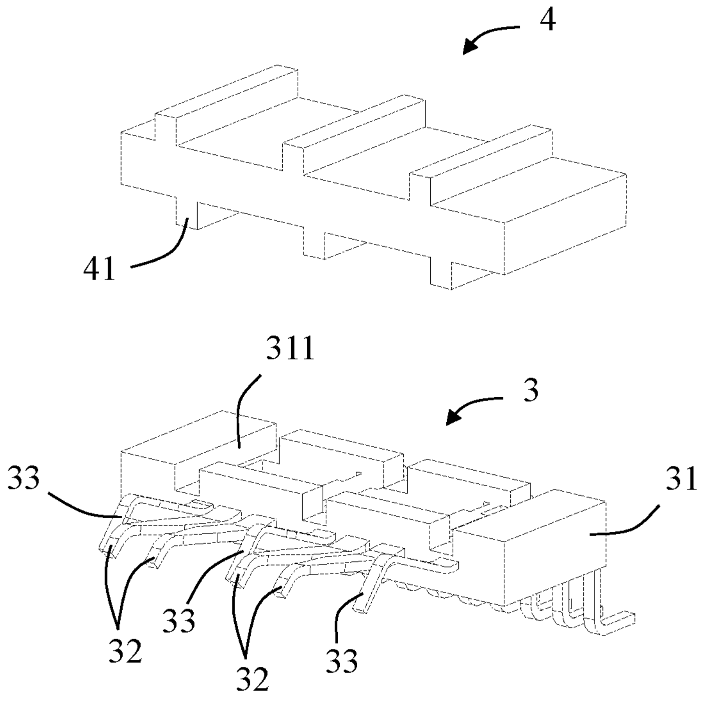
FIG. 11 is a perspective exploded view of a terminal module and an installation block, wherein the terminal module and the installation block are separated from each other.
Figure 12:
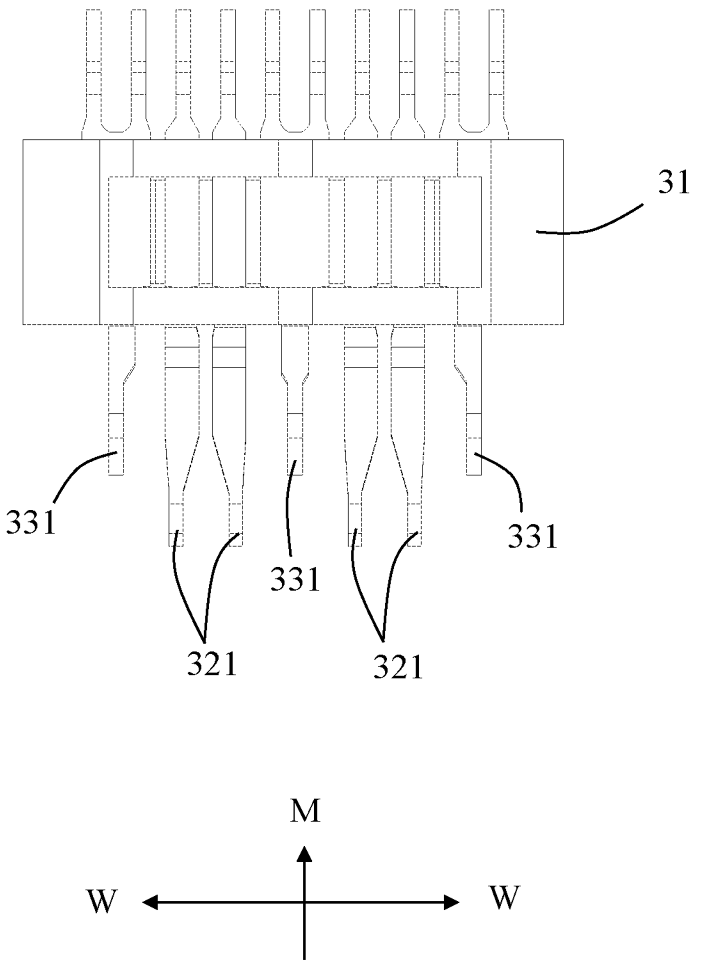
FIG. 12 is a top view of the terminal module in FIG. 11.
Figure 13:
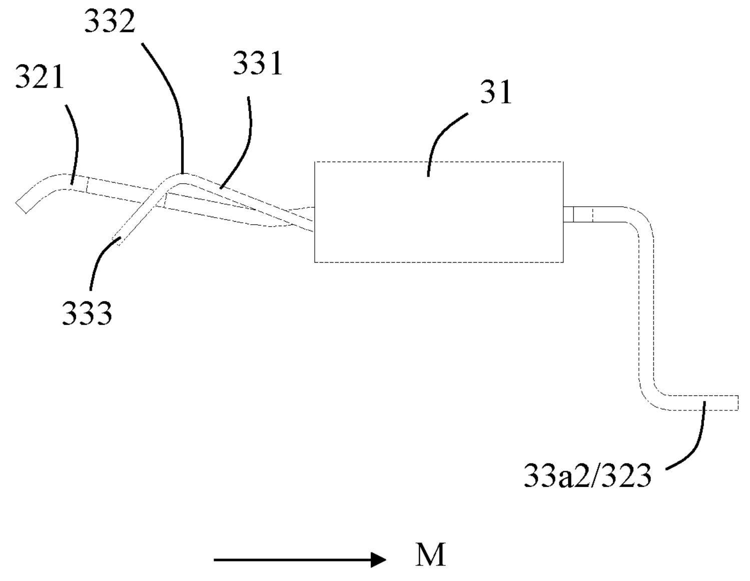
FIG. 13 is a side view of the terminal module in FIG. 11.
Figure 14:
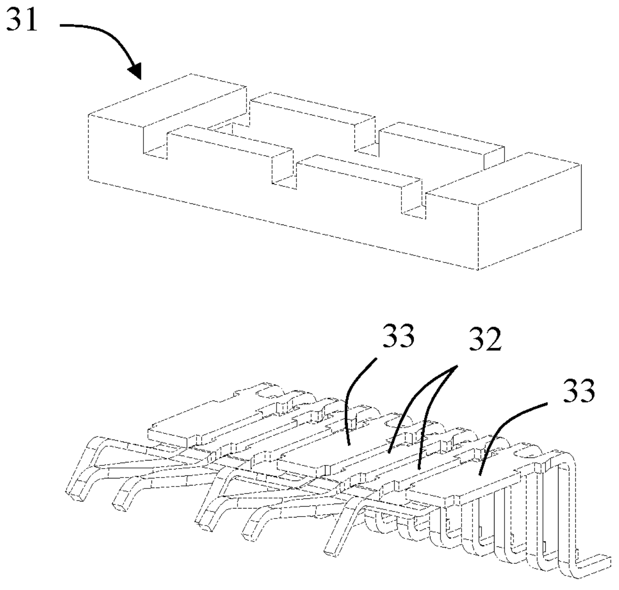
FIG. 14 is a partial perspective exploded view of the terminal module in FIG. 11, wherein an insulating block is separated.
Figure 15:
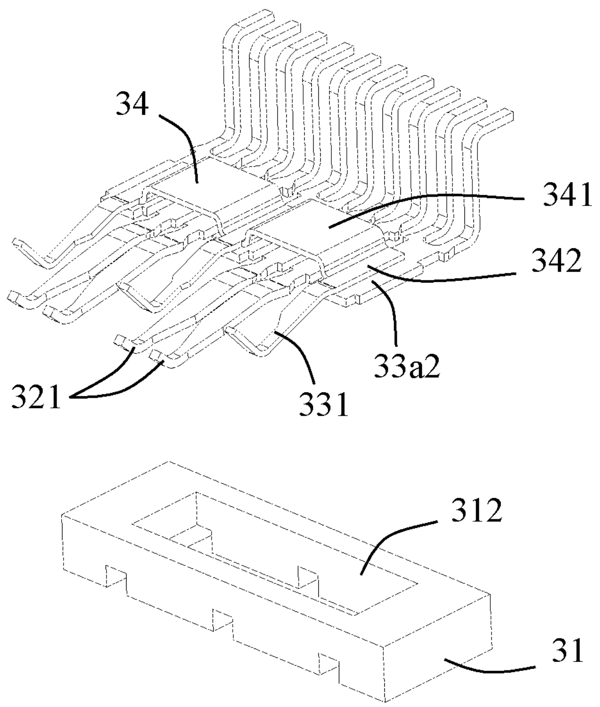
FIG. 15 is a partial perspective exploded view FIG. 14 from another angle.
Figure 16:
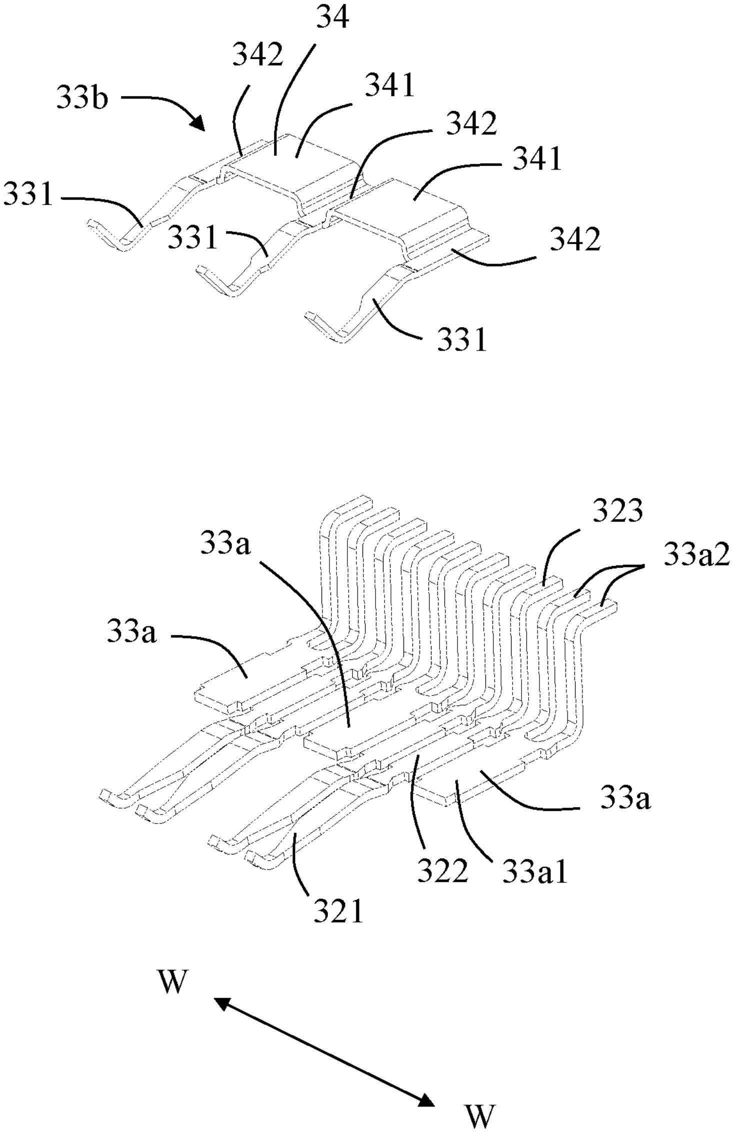
FIG. 16 is an exploded perspective view of a signal terminal and a ground terminal in FIG. 15, wherein a second part of the ground terminal is separated.

The insulating body 1 includes a mating surface 11, a rear end surface 12 opposite to the mating surface 11, and a mounting surface 13 at the bottom. The insulating body 1 further defines a mating slot 110 extending through the mating surface 11 and an installation space 120 extending through the rear end surface 12 (as shown in FIG. 9). The mating slot 110 is used for receiving the insertion portion 201 of the mating element 200 along the mating direction M (for example, a front-to-back direction). The installation space 120 communicates with the mating slot 110 for accommodating the terminal module 3 and the installation block 4 in a direction opposite to the mating direction M (for example, a back-to-front direction). The mounting surface 13 is used for mounting the electrical connector 100 on the circuit board. In the illustrated embodiment of the present disclosure, the insulating body 1 further includes a plurality of mounting posts 131 protruding downward beyond the mounting surface 13. The plurality of mounting posts 131 are used for being inserted into mounting holes (not shown) of the circuit board to realize positioning and fixing.

Figure 2:
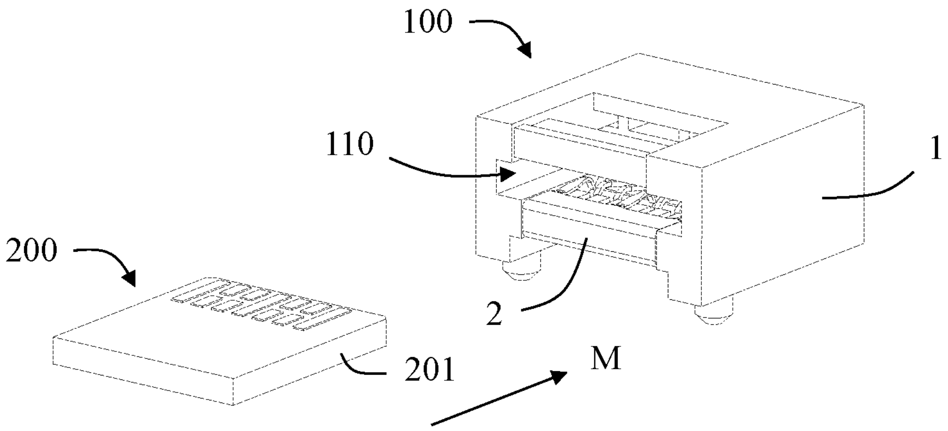
FIG. 2 is a perspective exploded view of FIG. 1, wherein a mating element and an electrical connector are separated from each other.
Figure 5:
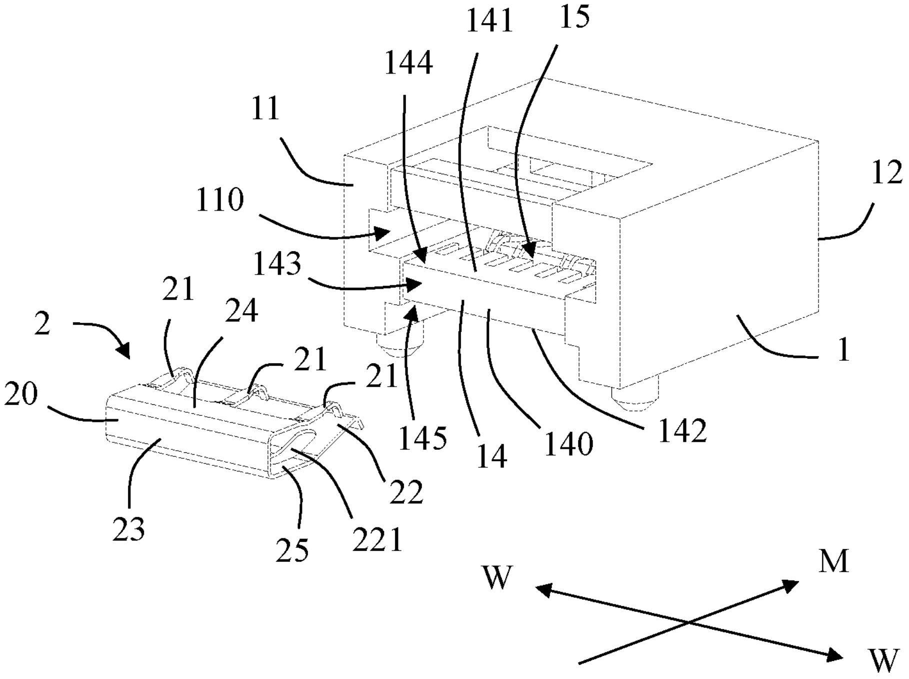
FIG. 5 is a partial perspective exploded view of the electrical connector in FIG. 2, wherein a grounding piece is separated.
Figure 6:
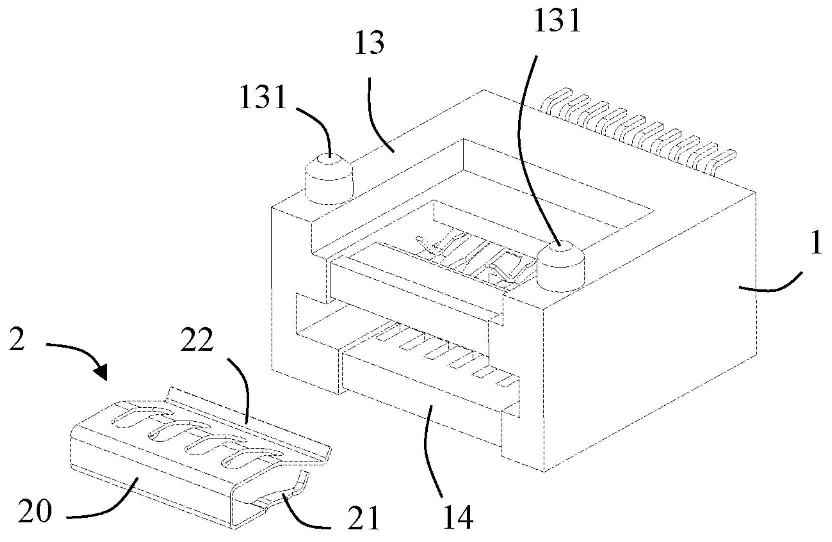
FIG. 6 is a partial perspective exploded view of FIG. 5 from another angle.
Figure 7:
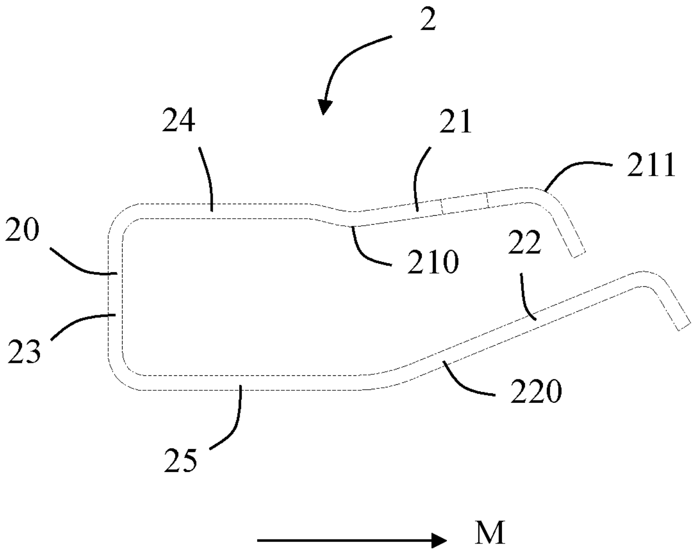
FIG. 7 is a side view of the grounding piece in FIG. 5.
Figure 8:
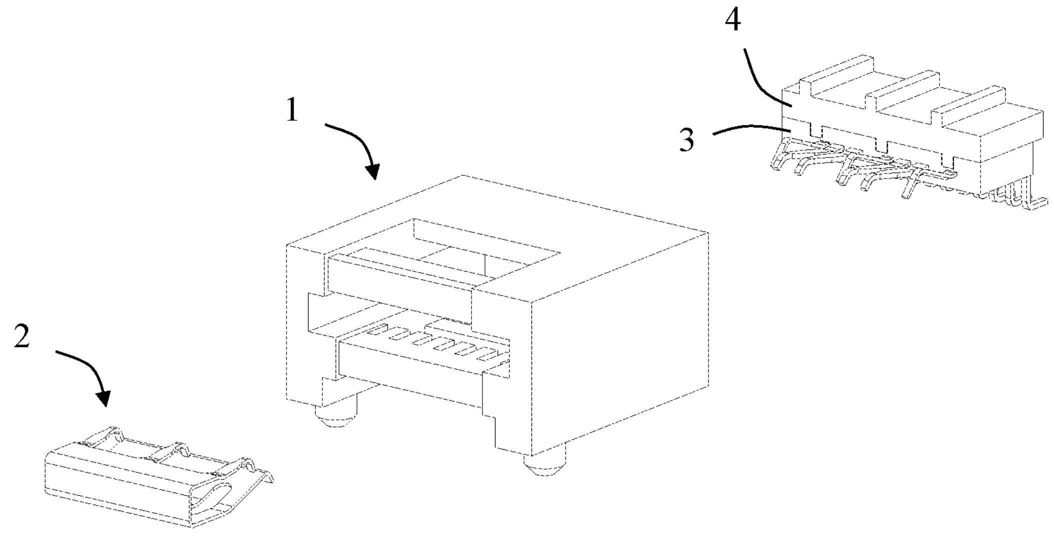
FIG. 8 is a further perspective exploded view of FIG. 5.

Referring to FIG. 2 and FIG. 5, the insulating body 1 further includes an installation wall 14 located on one side (for example, a lower side) of the mating slot 110. The installation wall 14 includes a front end surface 140, a first surface 141 (for example, an upper surface), and a second surface 142 (for example, a lower surface) opposite to the first surface 141. In the illustrated embodiment of the present disclosure, the insulating body 1 includes a first installation groove 143 located at a front end of the installation wall 14, a second installation groove 144 at a top of the installation wall 14, and a third installation slot 145 is located at a bottom of the installation wall 14. In the embodiment shown in the present disclosure, due to the existence of the first installation groove 143, the front end surface 140 is recessed backward relative to the mating surface 11, that is, the front end surface 140 is located at a rear end of the mating surface 11. The purpose of this design is that when the grounding piece 2 is installed on the insulating body 1, the grounding piece 2 will not protrude at least too much from the mating surface 11, which is beneficial to save space.

Figure 18:
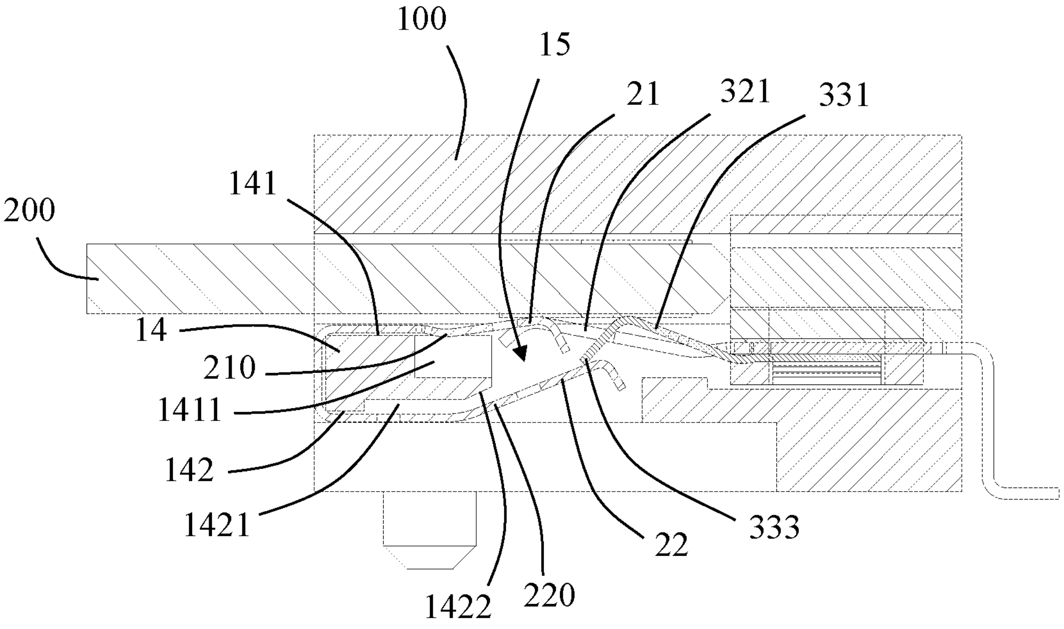
FIG. 18 is a schematic cross-sectional view taken along line A-A in FIG. 1.

Referring to FIG. 18, in the embodiment shown in the present disclosure, the installation wall 14 further includes at least one first groove 1411 recessed from the first surface 141 toward the second surface 142, a second groove 1421 recessed from the second surface 142 toward the first surface 141, and an inclined surface 1422 located at a rear end of the second groove 1421.

The insulating body 1 further includes a slot 15 located at a rear end of the installation wall 14 along the mating direction M. The slot 15 communicates with the mating slot 110. When the mating element 200 is inserted into the mating slot 110, the slot 15 provides a space for the conductive terminals of the terminal module 3 to deform (details will be described hereinafter).

Referring to FIG. 5 to FIG. 10, and FIG. 18, in the illustrated embodiment of the present disclosure, the grounding piece 2 is stamped from a metal sheet. The grounding piece 2 includes a base portion 20 fixed on the installation wall 14, at least one first grounding elastic arm 21 connected to the base portion 20, and at least one second grounding elastic arm 22 connected to the base portion 20. The base portion 20 includes a front wall 23, a first extension wall 24 extending from one end (for example, an upper end) of the front wall 23, and a second extension wall 25 extending from another end (for example, a lower end) of the front wall 23. When the grounding piece 2 is installed on the installation wall 14 along the mating direction M, the front wall 23 is accommodated in the first installation groove 143, and the front wall 23 covers the front end surface 140. The first extension wall 24 is accommodated in the second installation groove 144, and the first extension wall 24 leans against at least part of the first surface 141. The second extension wall 25 is accommodated in the third installation groove 145. The second extension wall 25 leans against at least part of the second surface 142. Preferably, the front wall 23 is flush with the mating surface 11.

Referring to FIG. 18, in the illustrated embodiment of the present disclosure, at least part of the first grounding elastic arm 21 corresponds to the first groove 1411. The first grounding elastic arm 21 is provided with a protrusion 210 partially protruding into the first groove 1411. In this way, the first surface 141 can provide better support for the deformation of the first grounding elastic arm 21 and reduce the failure risk thereof. In addition, at least part of the second grounding elastic arm 22 corresponds to the second groove 1421 and is not in contact with the installation wall 14, so as to provide a sufficient space for the second grounding elastic arm 22 to deform. The second grounding elastic arm 22 includes an inclined portion 220 corresponding to the inclined surface 1422.

In the illustrated embodiment of the present disclosure, a plurality of first grounding elastic arms 21 are provided and integrally extended from the first extension wall 24. The plurality of first grounding elastic arms 21 are arranged at intervals along the width direction W-W of the electrical connector. The width direction W-W is perpendicular to the butt direction M. The second grounding elastic arm 22 is integrally extended from the second extension wall 25. The second grounding elastic arm 22 includes a plurality of through holes 221 arranged at intervals along the width direction W-W to improve the elastic deformation capability of the second grounding elastic arm 22. Along the mating direction M, the second grounding elastic arm 22 extends beyond the first grounding elastic arm 21. In the illustrated embodiment of the present disclosure, a portion where the second grounding elastic arm 22 extends beyond the first grounding elastic arm 21 is an integral structure without any holes.

The first grounding elastic arm 21 extends into the mating slot 110 to contact the mating element 200. In the illustrated embodiment of the present disclosure, the first grounding elastic arm 21 includes a first arc-shaped contact surface 211 configured to abut against the first ground conductive pad 71. The second grounding elastic arm 22 at least partially extends into the slot 15.

The terminal module 3 includes an insulating block 31, a plurality of signal terminals 32 and a plurality of ground terminals 33. The signal terminals 32 and the ground terminals 33 are fixed to the insulating block 31. In an embodiment of the present disclosure, the plurality of signal terminals 32 and the ground terminals 33 are assembled and fixed to the insulating block 31. In the illustrated embodiment of the present disclosure, the plurality of signal terminals 32 and the ground terminals 33 are insert-molded in the insulating block 31. The method of fixing the signal terminals 32 and the ground terminals 33 to the insulating block 31 is well known to those skilled in the art, which will not be repeated in the present disclosure.

The ground terminal 33 includes a first elastic contact arm 331. The signal terminal 32 includes a second elastic contact arm 321. The second elastic contact arm 321 is configured to abut against the first signal conductive pad 72. The first grounding elastic arm 21 and the first elastic contact arm 331 are arranged at intervals along the mating direction M. When the mating element 200 is inserted into the mating slot 110 and inserted in place, the first grounding elastic arm 21 and the first elastic contact arm 331 are configured to abut against the first ground conductive pad 71. The first elastic contact arm 331 is configured to abut against the second grounding elastic arm 22. The slot 15 provides a space for the first grounding elastic arm 21, the first elastic contact arm 331 and the second elastic contact arm 321 to deform.

In the illustrated embodiment of the present disclosure, the first elastic contact arm 331 includes a second arc-shaped contact surface 332 and an end portion 333. The second arc-shaped contact surface 332 is configured to abut against the first ground conductive pad 71. The end portion 333 is configured to be in contact with the second grounding elastic arm 22. In the present disclosure, a portion where the second grounding elastic arm 22 extends beyond the first grounding elastic arm 21 is designed as an integral structure without any holes. By such setting, on the one hand, it is beneficial to increase the grounding area; and on the other hand, it is beneficial to improve the contact reliability between the end portion 333 and the second grounding elastic arm 22 after the mating element 200 is inserted into the mating slot 110.

In the illustrated embodiment of the present disclosure, the ground terminal 33 includes a plurality of first parts 33*a* and one second portion 33*b*. The first parts 33*a* and the second part 33*b* are independent components, which are manufactured separately and abutted against with each other. The second portion 33*b* includes a connecting portion 34 and the first elastic contact arm 331. In the illustrated embodiment of the present disclosure, a plurality of first elastic contact arms 331 are provided and integrally extended from the connecting portion 34. The connecting portion 34 is in contact with all the first parts 33*a*, so as to connect all the first parts 33*a* in series, thereby improving the grounding and shielding effects.

Each first part 33*a* includes a first fixing portion 33*a*1 and a first tail portion 33*a*2 extending from the first fixing portion 33*a*1. In the illustrated embodiment of the present disclosure, each first part 33*a* includes two first tail portions 33*a*2 arranged at intervals along the width direction W-W.

Each signal terminal 32 includes a second fixing portion 322, a second elastic contact arm 321 extending from one end of the second fixing portion 322, and a second tail portion 323 extending from the other end of the second fixing portion 322. Along the direction opposite to the mating direction M, a length of the second elastic contact arm 321 is greater than a length of the first elastic contact arm 331, and the second elastic contact arm 321 extends beyond the first elastic contact arm 331. Along the width direction W-W, a width of the first fixing portion 33*a*1 is larger than that of the second fixing portion 322 so as to improve the shielding effect. The first tail portion 33*a*2 and the second tail portion 323 are configured to be mounted on the circuit board. Alternatively, the first tail portion 33*a*2 and the second tail portion 323 are configured to be connected to cables. In the illustrated embodiment of the present disclosure, all of the first tail portions 33*a*2 are flush with all of the second tail portions 323 so as to facilitate surface mounting on the circuit board.

Figure 17:
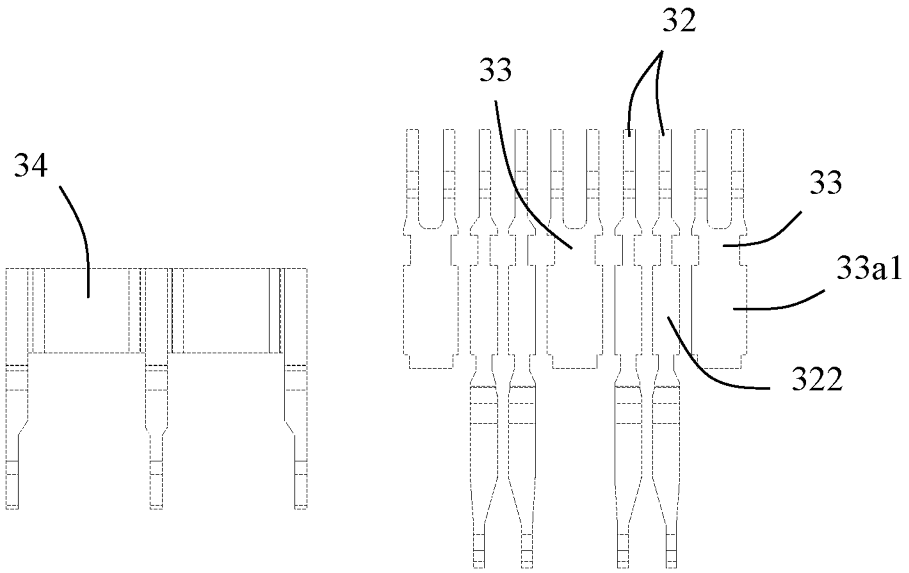
FIG. 17 is a top view of FIG. 16.

Referring to FIG. 17, in the embodiment illustrated in the present disclosure, two adjacent signal terminals 32 form a differential pair. Along the width direction W-W, two sides of each differential pair are respectively provided with one first part 33*a*. Specifically, along the width direction W-W, each of the two sides of the second fixing portion 322 of each differential pair is provided with one first part 33*a*; and each of the two sides of the second elastic contact arm 321 of each differential pair is provided with one first elastic contact arm 331.

In the illustrated embodiment of the present disclosure, the connecting portion 34 is wave-shaped. The connecting portion 34 comprises at least one raised portion 341 to avoid the differential pair and at least one contact portion 342 extending from the raised portion 341. In the illustrated embodiment of the present disclosure, a plurality of raised portions 341 are provided protruding downwardly. A plurality of contact portions 342 are provided, and respectively disposed on two sides of the raised portions 341 along the width direction W-W. The contact portions 342 are in contact with the first fixing portions 33*a*1 along a height direction of the electrical connector 100. Each first elastic contact arm 331 integrally extends from a corresponding contact portion 342. In one embodiment of the present disclosure, the contact portions 342 are fixed to the first fixing portions 33*a*1 by welding.

One of the insulating block 31 and the installation block 4 is provided with at least one rib 41, and a remaining one of the insulating block 31 and the installation block 4 is provided with at least one groove 311 to receive the rib 41. In the illustrated embodiment of the present disclosure, the rib 41 is disposed on the installation block 4, and the groove 311 is disposed on the insulating block 31. Of course, it is understandable to those skilled in the art that the rib 41 can also be provided on the insulating block 31, and the groove 311 can also be provided on the installation block 4. After the insulating block 31 and the installation block 4 are assembled, they are jointly installed in the installation space 120 of the insulating body 1 as a whole. In the present disclosure, the installation of the terminal module 3 can be adjusted by providing different installation blocks 4, thereby reducing the requirement on the size of the insulating block 31. Even in some cases, the common use of the terminal modules 3 can be realized to save costs.

In the illustrated embodiment of the present disclosure, the insulating block 31 is further provided with an opening 312, and the connecting portion 34 is received and exposed in the opening 312.

It is understandable to those skilled in the art that there may be two terminal modules 3, which are respectively located on two sides (for example, upper and lower sides) of the mating slot 110. At this time, when the mating element 200 is inserted, the conductive pads located on the upper and lower surfaces of the mating element 200 can be in contact with the corresponding elastic arms of the terminal modules 3, which is beneficial to further increase the speed of signal transmission.

Compared with the prior art, the present disclosure is provided with the grounding piece 2. The grounding piece 2 includes the base portion 20 fixed on the installation wall 14, at least one first grounding elastic arm 21 connected to the base portion 20, and at least one second grounding elastic arm 22 connected to the base portion 20. The first grounding elastic arm 21 extends into the mating slot 110. When the mating element 200 is inserted into the mating slot 100 and inserted in place, the first grounding elastic arm 21 and the first elastic contact arm 331 are configured to abut against the first ground conductive pad 71. The first elastic contact arm 331 is configured to abut against the second grounding elastic arm 22. In this way, the first grounding elastic arm 21 of the present disclosure abuts against the first ground conductive pad 71 to form a first ground contact. The first elastic contact arm 331 of the present disclosure abuts against the first ground conductive pad 71 to form a second ground contact. The first elastic contact arm 331 of the present disclosure abuts against the second grounding elastic arm 22 to form a third ground contact. By forming three ground contacts, the ground return path is reduced and the grounding and shielding effects is improved.

In the illustrated embodiment of the present disclosure, the grounding piece 2 is disposed at the front of the mating slot 110. When the mating module 200 is inserted, it first contacts with the grounding piece 2, which is also beneficial to eliminate static electricity. The first grounding elastic arm 21 and the second grounding elastic arm 22 are located adjacent to the second elastic contact arm 321, which is also beneficial to provide better shielding for differential signals during data transmission, thereby improving signal transmission quality.

Besides, in the present disclosure, the ground terminal 33 is designed as a two-piece configuration including the first part 33*a* and the second part 33*b*, so that the first elastic contact arm 331 integrally extends from the connecting portion 34. This is beneficial to increase the reliability when the first elastic contact arm 331 abuts against the first ground conductive pad 71.

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. An electrical connector, comprising:

an insulating body defining a mating slot configured to receive a mating element along a mating direction, the mating element having at least one first signal conductive pad and at least one first ground conductive pad;

a grounding piece comprising a base portion, at least one first grounding elastic arm connected to the base portion and at least one second grounding elastic arm connected to the base portion, the at least one first grounding elastic arm extending into the mating slot; and a terminal module comprising at least one signal terminal and at least one ground terminal, the at least one ground terminal comprising a first elastic contact arm, the at least one the signal terminal comprising a second elastic contact arm configured to abut against the at least one first signal conductive pad;

wherein the first grounding elastic arm and the first elastic contact arm are arranged at intervals along the mating direction; when the mating element is inserted into the mating slot and inserted in place, the first grounding elastic arm and the first elastic contact arm are configured to abut against the at least one first ground conductive pad, and the first elastic contact arm is configured to abut against the second grounding elastic arm.

2. The electrical connector according to claim 1, wherein the insulating body defines a slot communicating with the mating slot along a height direction of the electrical connector; the second grounding elastic arm at least partially extends into the slot.

3. The electrical connector according to claim 2, wherein the slot provides a space for the first grounding elastic arm, the first elastic contact arm and the second elastic contact arm to deform when the mating element is inserted into the mating slot.

4. The electrical connector according to claim 1, wherein the insulating body comprises an installation wall located on one side of the mating slot, the base portion of the grounding piece is installed on the installation wall, the installation wall comprises a front end surface, a first surface and a second surface opposite to the first surface; and wherein the base portion comprises a front wall, a first extension wall extending from one end of the front wall, and a second extension wall extending from another end of the front wall, the front wall covering the front end surface, the first extension wall leans against at least part of the first surface, and the second extension wall leans against at least part of the second surface.

5. The electrical connector according to claim 4, wherein the installation wall comprises at least one first groove recessed from the first surface toward the second surface, at least part of the first grounding elastic arm corresponds to the at least one first groove;

the installation wall comprises a second groove recessed from the second surface toward the first surface, so that at least part of the second grounding elastic arm is not in contact with the installation wall.

6. The electrical connector according to claim 5, wherein the first grounding elastic arm comprises a protrusion partially protruding into the at least one first groove.

7. The electrical connector according to claim 5, wherein the installation wall comprises an inclined surface located at a rear end of the second groove; the second grounding elastic arm comprises an inclined portion corresponding to the inclined surface.

8. The electrical connector according to claim 1, wherein the base portion comprises a front wall, a first extension wall extending from one end of the front wall, and a second extension wall extending from another end of the front wall;

a plurality of first grounding elastic arms are provided and integrally extended from the first extension wall, the plurality of first grounding elastic arms are arranged at intervals along a width direction of the electrical connector, the width direction is perpendicular to the mating direction;

the second grounding elastic arm is integrally extended from the second extension wall, the second grounding elastic arm comprises a plurality of through holes arranged at intervals along the width direction;

the second grounding elastic arm extends beyond the first grounding elastic arm along the mating direction.

9. The electrical connector according to claim 8, wherein a part of the second grounding elastic arm extending beyond the first grounding elastic arm is an integral structure which is configured to abut against the first elastic contact arm.

10. The electrical connector according to claim 1, wherein the first grounding elastic arm comprises a first arc-shaped contact surface configured to abut against the at least one first ground conductive pad;

the first elastic contact arm comprises a second arc-shaped contact surface and an end portion, the second arc-shaped contact surface is configured to abut against the at least one first ground conductive pad, and the end portion is configured to be in contact with the second grounding elastic arm.

11. The electrical connector according to claim 1, wherein the terminal module comprises an insulating block; the at least one signal terminal and the at least one ground terminal are fixed to the insulating block;

the ground terminal comprises a plurality of first parts and a second part which are manufactured separately and abutted against each together; the second part comprises a connecting portion and the first elastic contact arm; the first elastic contact arm is integrally extended from the connecting portion; the connecting portion is in contact with the plurality of first parts, so as to connect all the plurality of first parts in series.

12. The electrical connector according to claim 11, wherein a plurality of signal terminals are provided, and two adjacent signal terminals form a differential pair;

only one second part is provided; and along a width direction of the electrical connector, each of two sides of the differential pair is provided one first part; the width direction is perpendicular to the mating direction.

13. The electrical connector according to claim 11, wherein each first part is provided with a first fixing portion; the connecting portion is provided with a raised portion avoiding the differential pair and a contact portion extending from the raised portion; the contact portion is in contact with the first fixing portion along a height direction of the electrical connector; and the first elastic contact arm is integrally extended from the contact portion.

14. The electrical connector according to claim 1, further comprising an installation block mated with the insulating block; wherein one of the insulating block and the installation block is provided with a rib, and a remaining one of the insulating block and the installation block is provided with a groove to receive the rib; the insulating block and the installation block are installed on the insulating body as a whole.

15. An electrical connector, comprising:

an insulating body defining a mating slot configured to at least partially receive a mating element along a mating direction, the mating element being configured to at least one first signal conductive pad and at least one first ground conductive pad;

a metallic grounding piece comprising at least one first grounding elastic arm and at least one second grounding elastic arm, the at least one first grounding elastic arm extending into the mating slot; and a terminal module comprising at least one signal terminal and at least one ground terminal, the at least one ground terminal comprising a first elastic contact arm, the at least one the signal terminal comprising a second elastic contact arm configured to abut against the at least one first signal conductive pad;

wherein the first grounding elastic arm and the first elastic contact arm are arranged at intervals along the mating direction; when the mating element is inserted into the mating slot and inserted in place, the first grounding elastic arm and the first elastic contact arm abut against the at least one first ground conductive pad, and the first elastic contact arm abut against the second grounding elastic arm.

16. The electrical connector according to claim 15, wherein the insulating body defines a slot communicating with the mating slot along a height direction of the electrical connector; the second grounding elastic arm at least partially extends into the slot.

17. The electrical connector according to claim 16, wherein the slot provides a space for the first grounding elastic arm, the first elastic contact arm and the second elastic contact arm to deform when the mating element is inserted into the mating slot.

18. The electrical connector according to claim 15, wherein the first grounding elastic arm comprises a first arc-shaped contact surface configured to abut against the at least one first ground conductive pad;

the first elastic contact arm comprises a second arc-shaped contact surface and an end portion, the second arc-shaped contact surface is configured to abut against the at least one first ground conductive pad, and the end portion is configured to be in contact with the second grounding elastic arm.

19. The electrical connector according to claim 15, wherein the terminal module comprises an insulating block; the at least one signal terminal and the at least one ground terminal are fixed to the insulating block;

the ground terminal comprises a plurality of first parts and a second part which are manufactured separately and abutted against each together; the second part comprises a connecting portion and the first elastic contact arm; the first elastic contact arm is integrally extended from the connecting portion; the connecting portion is in contact with the plurality of first parts, so as to connect all the first parts in series.

20. The electrical connector according to claim 19, wherein a plurality of signal terminals are provided, and two adjacent signal terminals form a differential pair;

only one second part is provided; and along a width direction of the electrical connector, each of two sides of the differential pair is provided one first part; the width direction is perpendicular to the mating direction.

* * * * *